United States Patent
Wilson et al.

(10) Patent No.: US 6,941,975 B2
(45) Date of Patent: Sep. 13, 2005

(54) REFRIGERANT HOSE

(75) Inventors: Reji Paul Wilson, Fairlawn, OH (US); Brian Henry, Sun Prairie, WI (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/733,147

(22) Filed: Dec. 11, 2003

(65) Prior Publication Data

US 2004/0118469 A1 Jun. 24, 2004

Related U.S. Application Data

(63) Continuation-in-part of application No. 10/230,035, filed on Aug. 28, 2002, now abandoned.

(51) Int. Cl.[7] ................................. F16L 11/04
(52) U.S. Cl. ................... 138/141; 138/140; 138/137; 138/124; 138/125; 428/36.7
(58) Field of Search ................ 138/124–126, 138/137, 140, 141

(56) References Cited

U.S. PATENT DOCUMENTS

| | | | |
|---|---|---|---|
| 4,603,712 A | 8/1986 | Krause | 138/137 |
| 4,862,923 A | 9/1989 | Kitami et al. | 138/125 |
| 4,881,576 A * | 11/1989 | Kitami et al. | 138/125 |
| 4,907,625 A * | 3/1990 | Ito et al. | 138/126 |
| 4,998,564 A * | 3/1991 | Igarashi et al. | 138/126 |
| 5,016,675 A * | 5/1991 | Igarashi et al. | 138/125 |
| 5,038,833 A | 8/1991 | Brunnnhofer | 128/137 |
| 5,076,329 A * | 12/1991 | Brunnhofer | 138/137 |
| 5,474,109 A | 12/1995 | Stoeppelmann et al. | 138/137 |
| 5,476,121 A * | 12/1995 | Yoshikawa et al. | 138/138 |
| 5,488,975 A | 2/1996 | Chiles et al. | 138/125 |
| 5,679,425 A | 10/1997 | Plumley | 428/35.7 |
| 5,707,701 A | 1/1998 | Saitoh et al. | 428/36.91 |
| 5,937,911 A * | 8/1999 | Kodama et al. | 138/137 |
| 5,957,164 A * | 9/1999 | Campbell | 138/137 |
| 6,068,026 A * | 5/2000 | Garois | 138/126 |
| 6,166,143 A | 12/2000 | Watanabe et al. | 525/208 |
| 6,213,156 B1 | 4/2001 | Niki et al. | 138/126 |
| 6,257,281 B1 * | 7/2001 | Nie et al. | 138/137 |
| 6,279,615 B1 | 8/2001 | Iio et al. | 138/137 |
| 6,328,075 B1 | 12/2001 | Furuta et al. | 138/143 |
| 6,345,647 B2 | 2/2002 | Niki et al. | 138/126 |
| 6,412,520 B1 | 7/2002 | Yasumatsu et al. | 138/141 |
| 6,536,479 B2 * | 3/2003 | Wilson et al. | 138/137 |
| 6,555,243 B2 * | 4/2003 | Flepp et al. | 428/474.4 |
| 2001/0006712 A1 | 7/2001 | Hibino et al. | 428/36.91 |
| 2002/0074050 A1 | 6/2002 | Iketa et al. | 138/126 |

FOREIGN PATENT DOCUMENTS

| | | | |
|---|---|---|---|
| DE | 4310159 | 10/1993 | F16L/11/04 |
| WO | 9513186 | 5/1995 | B32B/25/08 |

* cited by examiner

Primary Examiner—Patrick Brinson
(74) Attorney, Agent, or Firm—Nancy T. Krawczyk

(57) ABSTRACT

A hose suitable for use in refrigerant systems. The hose has a barrier layer formed of at least two layers of thermoplastic resin. At least one of the layers is a vinyl resin. The resins are selected so that the hose has a permeation rate of virtually zero.

12 Claims, 2 Drawing Sheets

REFRIGERANT HOSE

RELATED APPLICATION

This patent application is a continuation-in-part of and claims priority to U.S. Ser. No. 10/230,035, filed on Aug. 28, 2002 now abandoned, entitled "Refrigerant Hose".

FIELD OF THE INVENTION

The present invention is directed to a hose suitable for use in refrigerant systems such as vehicle, industrial, and residential refrigerant systems. The hose is a combination of elastomeric materials to provide flexibility and thermoplastic materials to provide impermeability.

BACKGROUND OF THE INVENTION

Hoses are used for transporting refrigerants in vehicle air conditioning systems, and in industrial and residential refrigerant systems. The hoses generally have a three-layer laminar construction consisting of an innermost layer, a reinforcing layer, and an outermost cover layer. Generally, the inner and outer layers are formed of rubber, including butyl rubbers (IIR, CIIR, BIIR or BIMS), ethylene propylene diene rubber (EPDM), chloroprene rubber (CR), nitrile rubbers (NBR, HNBR), or ethylene acrylic copolymer rubber (AEM). The reinforcing fiber layer usually is a mesh structure formed by braided organic yarn such as polyester fiber, rayon fiber, or nylon fiber. The outer cover typically is formed of EPDM, CR, butyl rubbers, or AEM. Adhesion layers may be employed between the layers.

The hoses discussed above have a high degree of flexibility. Because of this, the rubber hoses can be handled with ease. However, rubber materials generally tend to have high gas permeability. Attempts to improve the resistance of conventional rubber hoses to refrigerant permeation have been made by incorporating polyamide layers, such as nylon 6, nylon 66, modified nylon 6, or alloys of nylon 6, etc, as an inner layer. However, the use of such polyamide layers, while reducing permeation rates, also reduces the flexibility of the hoses. To achieve an acceptable compromise of the required characteristics, the thickness of a nylon inner core layer is conventionally at least 0.5 mm (0.02"), see also U.S. Pat. No. 4,633,912 who discloses a polyamide blend cores tube with a gauge thickness of 1.07 mm and 0.81 mm.

Hoses may be characterized as barrier or veneer hose, the distinction between the two being the type of material forming the innermost layer. Barrier hoses have the innermost layer formed of an elastomeric material and a barrier layer located outward of the innermost layer. In hoses where the barrier layer is the innermost layer, the hose is referred to a veneer hose. Some applications may use either type of hose, such as fuel hose, while other applications may require a specific internal material and thus only one type of hose would be appropriate.

SUMMARY OF THE INVENTION

The present invention is directed to a hose suitable for transporting refrigerants. The hose has a high resistance to permeation and high flexibility. The hose comprising has a barrier layer, an intermediate elastomeric layer, a reinforcing layer, and a cover layer. To achieve the high resistance to permeation, producing an almost zero permeation rate hose, the barrier layer is formed of at least two resin layer wherein at least one of the resin layers is formed from a vinyl resin.

In one aspect of the disclosed invention, the hose is a barrier hose. Radially inward of the multi-layer barrier layer is an elastomeric layer. The elastomeric layer forms the innermost layer of the hose and is in direct contact with any fluids or gasses that will flow through the hose.

In another aspect of the invention, the hose is a veneer hose. That is, the barrier layer is the radially innermost layer of the hose and is in direct contact with any fluids or gasses that will flow through the hose.

In another aspect, the barrier layer of the hose is formed of three resin layers. In such a construction, the material forming the innermost resin layer is repeated as the radially outermost resin layer. This construction is the most expeditious regarding manufacturing; however, the third resin layer may also be formed from a third resin material.

In one aspect of the invention, the vinyl resin forming one of the barrier layers is selected from the group consisting of vinyl acetate (EVA), polyvinylalcohol (PVA), vinyl alcohol/ethylene copolymer (EVOH), polyvinylidene chloride (PVDC), polyvinyl chloride (PVC), vinyl chloride/vinylidene chloride copolymer, and vinylidene chloride/methylacrylate copolymer.

In another aspect of the invention, the non-vinyl resin barrier layer is formed of a material selected from the group consisting of polyolefin thermoplastic resins or polyamide thermoplastic resins.

In another aspect of the invention, the intermediate rubber layer, and the innermost rubber layer when the hose construction is a barrier hose, is formed of a material from the group consisting of chloroprene rubbers, nitrile rubbers, ethylene-propylene rubber, ethylene propylene diene rubber (EPDM), butyl rubbers (IIR, CIIR, BIIR), chlorosulfonated polyethylene rubber (CSM), ethylene-acrylic copolymer rubber (AEM), chlorinated polyethylene rubber (CPE), or brominated isobutylene-paramethylstyrene (BIMS).

In another aspect of the invention, each resin layer in the barrier layer has a radial thickness of 0.001 to 0.010 in (0.025 to 0.254 mm).

BRIEF DESCRIPTION OF THE DRAWINGS

The invention will be described by way of example and with reference to the accompanying drawings in which.

DETAILED DESCRIPTION OF THE INVENTION

Figure 1:
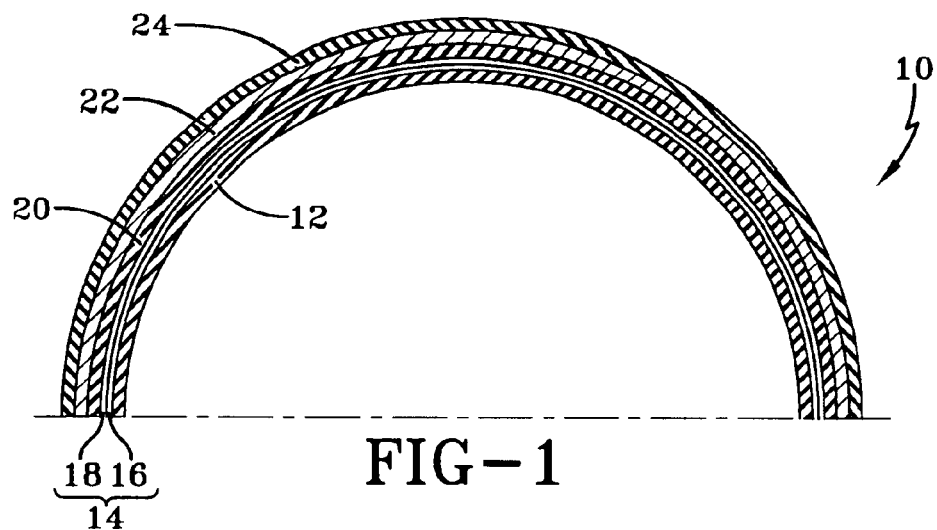
FIG. 1 is a cross-sectional view of a partial hose in accordance with the present invention.

The refrigerant hose 10 of the present invention is illustrated in FIG. 1. The hose 10 has a core layer 12, relative to the radial direction of the hose and the longitudinal hose axis. The core layer 12 is formed from an elastomeric material. Over the core layer 12 is the barrier layer 14 formed of at least two thermoplastic layers, 16, 18. Over the barrier layer is an intermediate elastomeric layer 20, reinforcing layer 22 and a cover layer 24.

The core layer 12 is formed from an elastomeric material. As this layer 12 is adjacent to the veneer barrier layer, it must be able to bond to the barrier layer 14. Such materials include, but are not limited to chloroprene rubbers, nitrile rubbers, ethylene-propylene rubber, ethylene propylene diene rubber (EPDM), butyl rubbers (IIR, CIIR, BIIR), chlorosulfonated polyethylene rubber (CSM), ethylene-acrylic rubber (AEM), chlorinated polyethylene rubber (CPE), or brominated isobutylene-paramethylstyrene (BIMS). The core layer 12 may also be formed from thermoplastic elastomers or thermoplastic vulcanizates such as polyproplene, polyethylene, or other polyolefins blended with EPDM, IIR, NBR, or acrylic rubber.

The barrier layer 14 is formed of a first thermoplastic layer 16, the material having a low permeation rate. Suitable low permeability materials include polyolefin thermoplastic resins, such as high density polyethylene (HDPE), ultrahigh molecular weight polyethylene (UHMWPE), polypropylene (PP), and ethylene propylene copolymer thermoplastic resin; and polyamide thermoplastic resins such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, and nylon 66/PPS copolymer. To achieve a low permeation of the completed hose, when using a polyamide resin, or a blend of polyamide resins, the polyamide is preferably non-plasticized. The addition of a plasticizer to the polyamide improves the flexibility of the material; however, it also decreases the permeability characteristics of the nylon. Thus, non-plasticized polyamide are preferred.

The second layer 18 in the barrier layer 14 is a low permeability material differing from the first thermoplastic layer 16. The preferred material is a vinyl resin such as vinyl acetate (EVA), polyvinylalcohol (PVA), vinyl alcohol/ ethylene copolymer (EVOH), polyvinylidene chloride (PVDC), polyvinyl chloride (PVC), vinyl chloride/ vinylidene chloride copolymer, and vinylidene chloride/ methylacrylate copolymer.

In constructing the barrier layer 14, the first layer 16 may be the radially innermost layer or the second layer 18 may be the radially innermost layer. To maintain the required flexibility of the hose 10, each individual resin layer 16, 18, has a radial thickness of 0.001 to 0.010 in (0.025–0.254 mm). A preferred thickness for each resin layer is 0.001 to 0.005 in (0.025–0.127 mm).

The intermediate layer 20, which is directly adjacent to barrier layer 14, must be able to bond to the barrier layer 14. This layer is formed of the same materials suitable for the innermost layer 12.

The reinforcing layer 22 may be formed by braiding, spiraling, knitting, or helical knitting of yarn. The yarn may be selected from conventional hose reinforcing yarns such as glass, steel, cotton, polyester, or aramid fibers, or a blend of any of these fibers.

The cover layer 24 is selected from known hose cover layer materials, including but not limited to nitrile-butadiene rubber (NBR), chlorosulfonated polyethylene rubber (CSM), EPDM, butyl rubbers, chlorinated butyl rubber (Cl-IIR), brominated butyl rubber (Br-IIR), epichlorohydrine rubber, acrylic rubber (AEM), chloroprene rubber (CR), BIMS, and the like. Similar to the core layer 12, the cover may also be formed from thermoplastic elastomers or thermoplastic vulcanizates.

The hose 10 has a permeation rate of not greater than 0.001 g/cm/day of R134 refrigerant, with a preferred permeation rate of not greater than 0.0003 g/cm/day of R134 refrigerant. A permeation rate this low may be considered to be a zero permeation rate. Conventionally, to obtain permeation rates this low, a thin metallic layer is employed in the hose. The present invention achieves a very low, to zero, permeation rate without the use of a metallic foil or layer within the hose.

Figure 2:
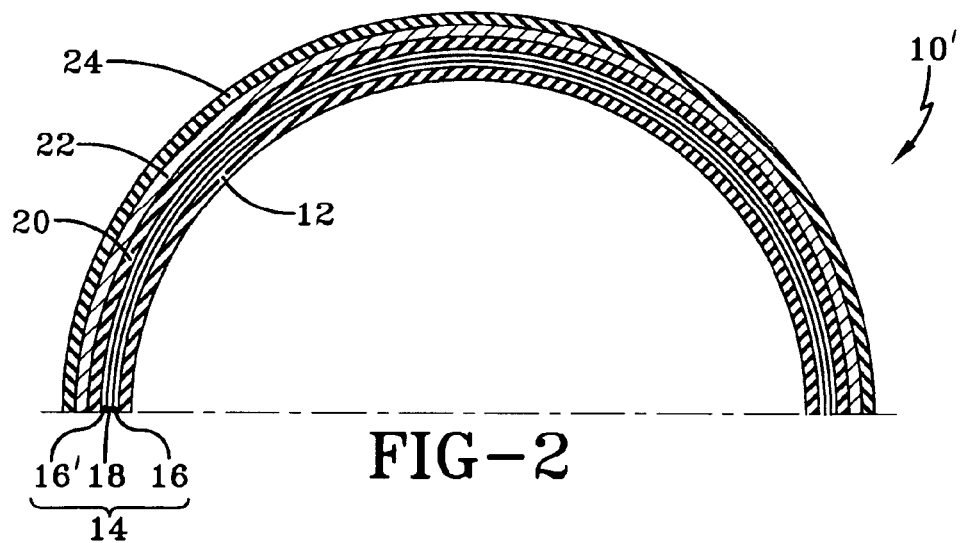
FIG. 2 is another embodiment of the inventive hose.

A second embodiment of the present invention is illustrated in FIG. 2. The hose 10' has an innermost layer 12, a barrier layer 14, an adjacent elastomeric friction layer 20, a reinforcing layer 22, and a cover layer 24. In this embodiment, the barrier layer 14 of the hose 10' has three layers, 16, 18, 16'. The material selected for the radially innermost layer is repeated as the third, and radially outermost layer. Preferably, the middle layer is formed of the material having the lowest permeation rate.

Figure 3:
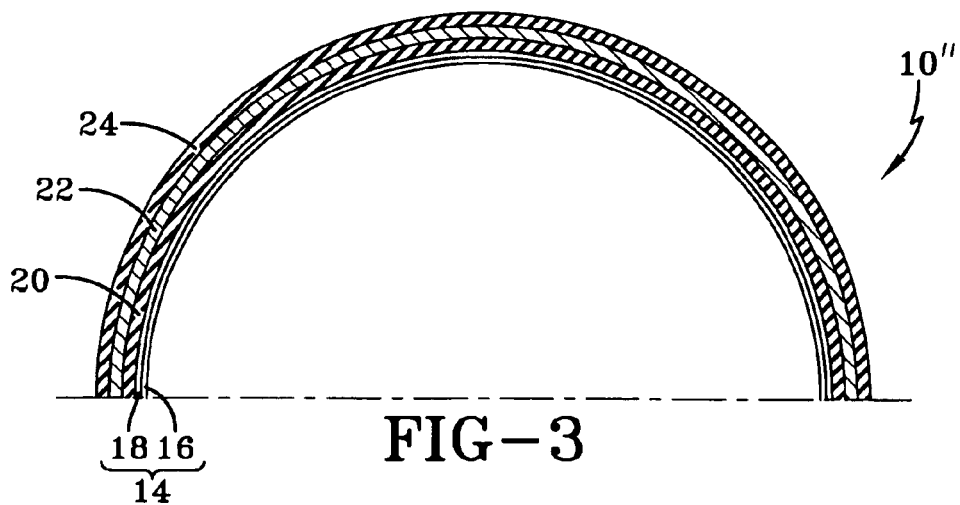
FIG. 3 is another embodiment of the inventive hose.

A third embodiment of the present invention is illustrated in FIG. 3. In this embodiment, the hose 10" has no innermost elastomeric layer 12. Instead, the barrier layer 14 forms the innermost layer and the hose 10" is a veneer hose. In the illustrated embodiment, the barrier layer is formed of two barrier layers, 16, 18 formed of the materials, and in the manner, discussed above. Similar to the second embodiment, the veneer hose 10" may also have the barrier layer 14 formed of three layers wherein the innermost barrier layer 16 is repeated, sandwiching the second barrier layer 18.

The intended use of the hose, including the intended fluid or gas that will flow through the hose, will determine which of the various disclosed barrier or veneer hose constructions is appropriate.

Construction of the hose 10 is accomplished in the following manner.

The innermost layer is extruded onto either a flexible or fixed mandrel. The barrier layer is formed by co-extruding the different layers simultaneously onto the innermost layer. A multi-layer head is used for the extrusion. When the barrier layer is formed as a three-layer element, a tri-extrusion head is used. When forming the barrier layer as a two layer element, a dual extrusion head or a tri-extrusion, with one silent port, may be used. No adhesive is applied between the different barrier layers as the bonding between the layers is accomplished through melt bonding.

After the barrier layer is formed, either another elastomeric layer is applied or the reinforcement layer is immediately applied. The cover layer is applied last. The formed hose length is then vulcanized to cure the elastomeric layers. The hose length may be cut into definitive lengths either before or after curing. If the hose length is cut prior to curing, then typically, the hose lengths are cured on fixed curve short length mandrels designed to impart a fixed and final configuration to the hose.

Exemplary Hose

A hose in accordance with the invention was constructed. The innermost layer was formed of CR. The barrier was formed of three layers: a non-plasticized copolymer of nylon 6 and nylon 66, a middle layer of EVOH, and a repeated layer of the non-plasticized nylon 6,66 copolymer. Each of the barrier layers had a thickness of about 0.002" (0.007 mm) for a total thickness of about 0.006" (0.024 mm). Outward of the barrier layer, another layer of CR was applied. A reinforcing layer of polyester was applied. The cover layer was formed of a butyl rubber.

Comparative 1

A commercially available, low-permeation rate hose was procured. The hose has an innermost layer of CR, a barrier layer of a plasticized nylon 6-66 copolymer, an NBR friction layer, polyester reinforcement, and a cover layer of chlorobutyl rubber. This hose is the Goodyear Galaxy 534-860-013 hose sold by The Goodyear Tire & Rubber Company.

Comparative 2

A second commercially available, low permeation hose was procured. The hose has an innermost layer of CR, a barrier layer of non-plasticized nylon 6-66 copolymer, a CR friction layer, polyester reinforcement, and a cover layer of chloro-butyl rubber. This hose is the Goodyear Galaxy 534-890-013 hose sold by The Goodyear Tire & Rubber Company.

The three hoses where cut into sections and tested for permeation rates using SAE J2064, with any modifications to the test noted herein. Different lengths of the hoses were prepared and one end was sealed. Each length was charged with R134 refrigerant with 0.6 g/cm$^3$ of internal hose volume and then the open end of the hose was sealed. The total weight of the hose and contained fluid is measured. The hose section is then left in an ambient environment at 90° C. The weight of the hose is measured every day for two weeks, and then every other day for another week. The permeation rate is then calculated based on the weight loss per section length per day for the last five days (steady state).

Figure 4:
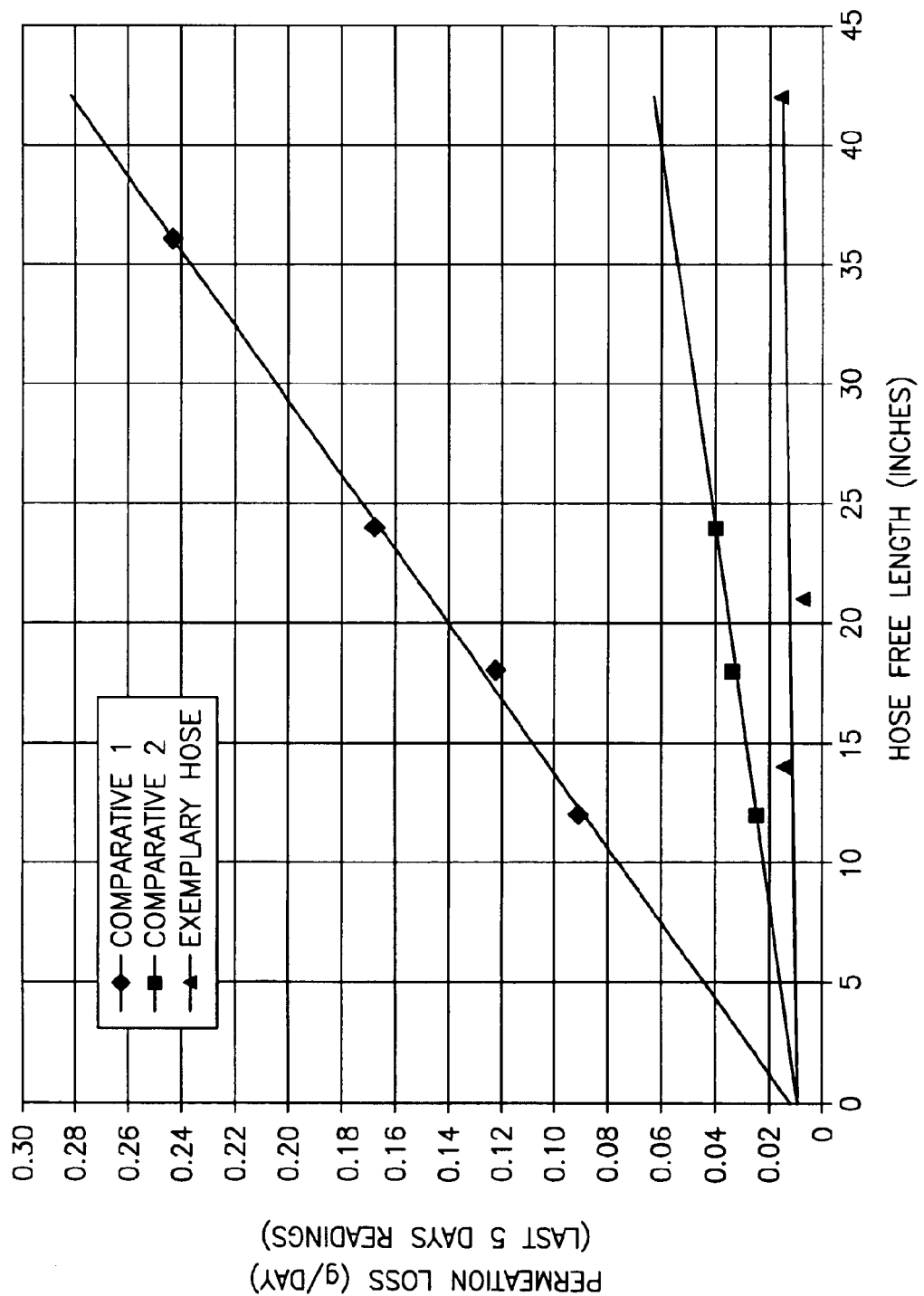
FIG. 4 is a graph comparing steady state permeation rates.

The results of the permeation rates of the inventive hose and the two comparative hoses are shown in FIG. 4. Comparative hose 1 showed a permeation rate of 0.0064 g/in/day ($2.52 \times 10^{-3}$ g/cm/day). Comparative hose 2 showed a permeation rate of 0.0013 g/in/day ($5.12 \times 10^{-4}$ g/cm/day). The inventive hose showed a permeation rate of 0.0001 g/in/day ($3.94 \times 10^{-5}$ g/cm/day). The inventive hose exhibits a significant improvement in low permeation compared to the other hoses.

The permeation test was performed on a barrier hose. A veneer hose constructed with the disclosed barrier layer would have a permeation rate similar to that for the barrier hose.

This hose has been described as being useful for refrigerants, including but not limited to R134A, but is also useful for other types of fluids or gases, such as $CO_2$. The disclosed veneer hose is most suitable for $CO_2$ applications; when used in such applications, the permeation rate is still tested as disclosed above, using R134 refrigerant and expressing the permeation rate in terms of g/cm/day of R134 refrigerant.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A hose comprising an inner barrier layer, a radially outer intermediate layer bonded directly to the inner barrier layer, a reinforcing layer, and a cover layer, wherein the barrier layer is formed of at least two resin layers and wherein the two resin layers are formed of two different materials and at least one of the resin layers is a vinyl resin.

2. A hose in accordance with claim 1 wherein the hose is further comprised of an elastomeric layer radially inward of the barrier layer.

3. A hose in accordance with claim 1 wherein the barrier layer is the radially innermost layer of the hose.

4. A hose in accordance with claim 1 wherein the barrier layer is formed of three resin layers.

5. A hose in accordance with claim 4 wherein the radially innermost resin layer and the radially outermost resin layer are formed of the same resin material.

6. A hose in accordance with claim 1 wherein the vinyl resin is selected from the group consisting of vinyl acetate (EVA), polyvinylalcohol (PVA), vinyl alcohol/ethylene copolymer (EVOH), polyvinylidene chloride (PVDC), polyvinyl chloride (PVC), vinyl chloride/vinylidene chloride copolymer, and vinylidene chloride/methylacrylate copolymer.

7. A hose in accordance with claim 1 wherein the non-vinyl resin barrier layer is formed of a material selected from the group consisting of polyolefin thermoplastic resins or polyamide thermoplastic resins.

8. A hose in accordance with claim 1 wherein the hose has a permeation rate of not greater than 0.0010 g/cm/day of R134 refrigerant.

9. A hose in accordance with claim 1 wherein the hose has a permeation rate of not greater than 0.0003 g/cm/day of R134 refrigerant.

10. A hose in accordance with claim 1 wherein each resin layer in the barrier layer has a radial thickness of 0.001 to 0.010 in (0.025 to 0.254 mm).

11. A hose in accordance with claim 1 wherein each resin layer in the barrier layer has a radial thickness of 0.001 to 0.005 in (0.025 to 0.127 mm).

12. A hose in accordance with claim 1 wherein the intermediate layer is formed of a material from the group consisting of chloroprene rubbers, nitrile rubbers, ethylene-propylene rubber, ethylene propylene diene rubber (EPDM), butyl rubbers (IIR, CIIR, BIIR), chlorosulfonated polyethylene rubber (CSM), ethylene-acrylic copolymer rubber (AEM), chlorinated polyethylene rubber (CPE), brominated isobutylene-paramethylstyrene (BIMS), thermoplastic elastomers, and thermoplastic vulcanizates.

* * * * *